United States Patent [19]

Hettrick et al.

[11] Patent Number: 4,776,696
[45] Date of Patent: Oct. 11, 1988

[54] OPTICAL SYSTEM FOR HIGH RESOLUTION SPECTROMETER/MONOCHROMATOR

[75] Inventors: Michael C. Hettrick, Berkeley; James H. Underwood, Walnut Creek, both of Calif.

[73] Assignee: Michael C. Hettrick, Berkeley, Calif.

[21] Appl. No.: 28,564

[22] Filed: Mar. 20, 1987

[51] Int. Cl.⁴ .................................................. G01J 3/18
[52] U.S. Cl. .................................... 356/328; 356/334; 378/85; 250/37 R
[58] Field of Search ............................ 378/70, 84, 85; 250/372, 373; 356/305, 326, 328, 331-334, 51

[56] References Cited

U.S. PATENT DOCUMENTS

| | | |
|---|---|---|
| 2,995,973 | 8/1961 | Barnes et al. |
| 4,012,843 | 3/1977 | Harada ............................. 33/19 A |
| 4,192,994 | 3/1980 | Kastner ............................. 356/334 |
| 4,312,569 | 1/1982 | Harada |
| 4,398,823 | 8/1983 | Brown ............................. 356/334 |
| 4,492,466 | 1/1985 | Aspnes ............................. 356/334 |

OTHER PUBLICATIONS

H. A. Rowland, "On concave Gratings for Optical Purposes", Phil Magazine; vol. 16, 1883, pp. 197–210.
R. J. Fonck et al., "Multichannel Grazing Incidence Spectrometer for Plasma Impurity Diagnosis; Spred", Applied Optics, vol. 21, No. 12, Jun. 15, 1982, pp. 2115–2123.
Kita et al., "Mechanically Ruled Aberration-Corrected Concave Gratings For a Flat Field Grazing Incidence Spectrograph", Applied Optics, vol. 22, No. 4, Feb. 15 1983, pp. 512–513.
Monk G, "A Mounting For the Plane Grating", J.O.S.A & R.S.I., vol. 17, Nov. 1928, pp. 358–364.
Murty, M., "Use of Convergent and Divergent Illumination with Plane Gratings", Journal of the Optical Society of America, vol. 57, No. 7, Jul. 1962, pp. 768–773.
Hettrick, M. et al., "Variable Line Space Gratings: New Design For Use In Grazing Incidence Spectrometers", Applied Optics, vol. 22, Dec. 15, 1983, pp. 3921–3924.
Hettrick, M., "Aberrations of Varied Line-Space Grazing Incidence Gratings in Converging Light Beams", Applied Optics, vol. 23, Sep. 15, 1984, pp. 3227–3235.
Hettrick, M. "Extreme Ultraviolet Explorer Spectrometer", Applied Optics, vol. 24, Jun. 15 1985, pp. 1737–1756.
Lai, B. et al., "A New Undulator Grazing Incidence Monochromator", Nuclear Instruments and Methods in Physics Research; A246, 1986, pp. 297–302.
Pouey, M., "New Stigmatic XUV Plane Gratings Spectrometers", SPIE, vol. 597, X-Ray Instrumentation in Astronomy, 1985, pp. 402–405.
Harada, T. et al., "A Grazing Incidence Monochromator with a Varied Space Plane Grating For Synchrotron Radiation", Proc. Soc. Photo-Opt. Instrument Eng., vol. 503, 1984, p. 114 et seq.
Pouey, M., "Dedicated Undulator Monochromators", Nuclear Instruments and Methods in Physics Research, A 246, 1986, pp. 256–259.
Hettrick et al., "A Reflection Grating Spectrometer for the X-Ray Multi-Mirror (XMM) Space Observatory: Design and Calculated Performance", S.P.I.E., vol. 597, X-Ray Instrumentation In Astronomy, 1985, pp. 291–300.
Kirkpatrick, P. and Baez, A., "Formation of Optical Images in X-Rays", Journal Of Optical Society, vol. 38, (1948), (pp. 766 et seq.).
Underwood, J., "Generation of a Parallel X-Ray Beam and Its Use For Testing Collimators", Space Science Instrumentation, vol. 3, 1977, p. 259–270.

Primary Examiner—F. L. Evans
Attorney, Agent, or Firm—Bielen and Peterson

[57] ABSTRACT

An optical system for use in a spectrometer or monochromator employing a mirror which reflects electromagnetic radiation from a source to converge with same in a plane. A straight grooved, varied-spaced diffraction grating receives the converging electromagnetic radiation from the mirror and produces a spectral image for capture by a detector, target or like receiver.

34 Claims, 4 Drawing Sheets

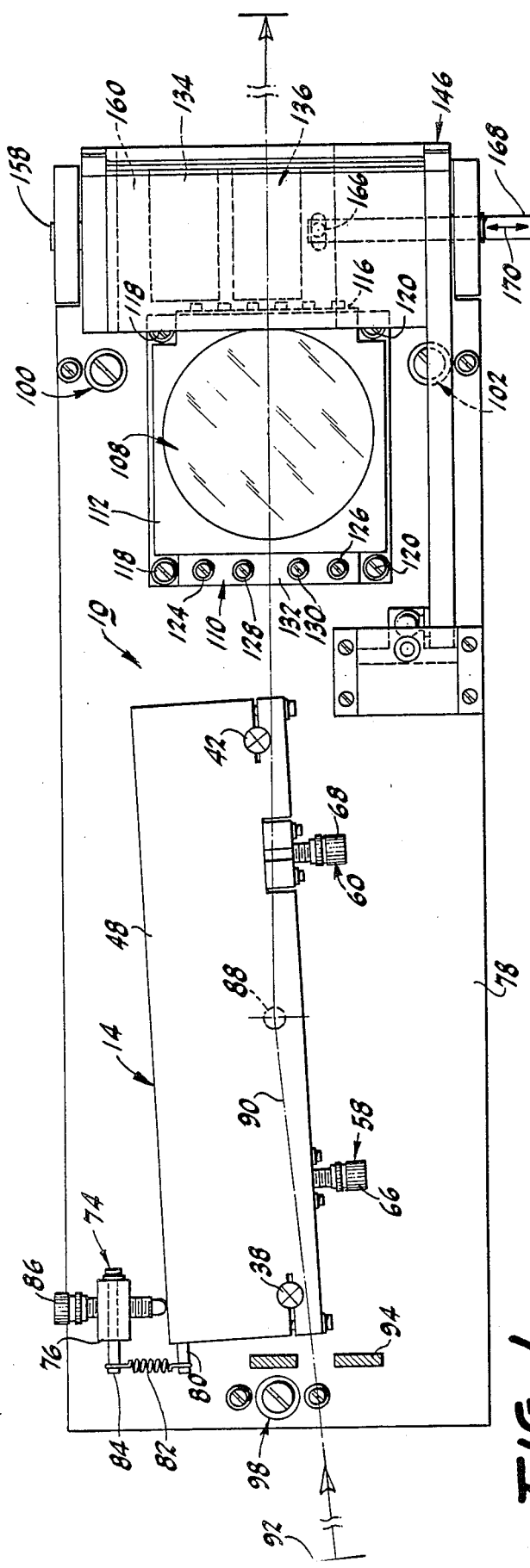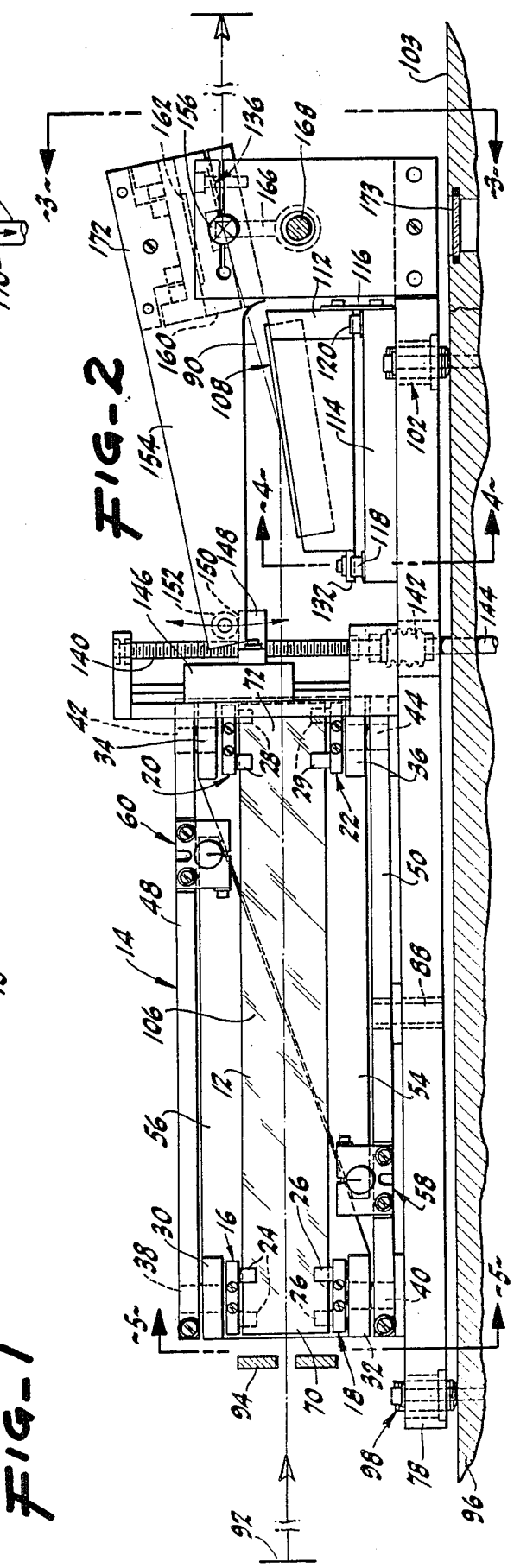

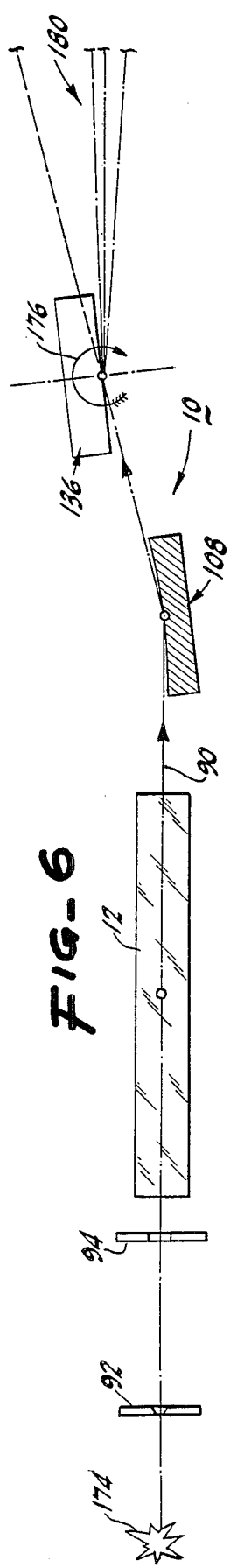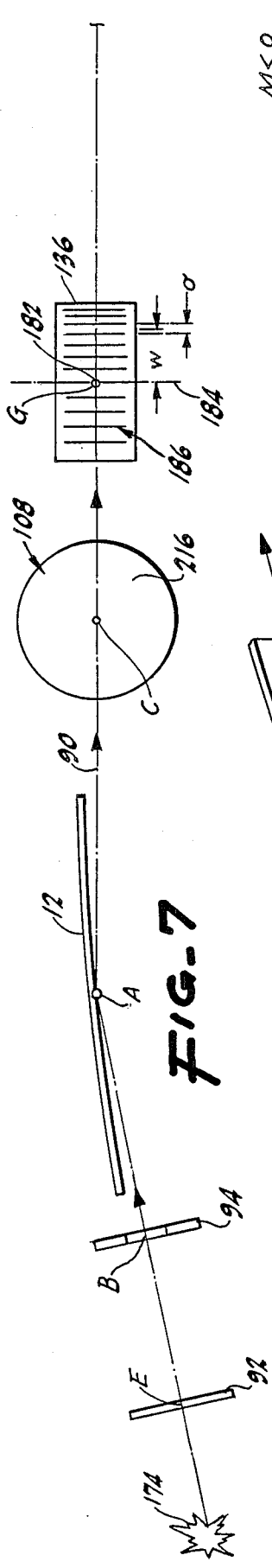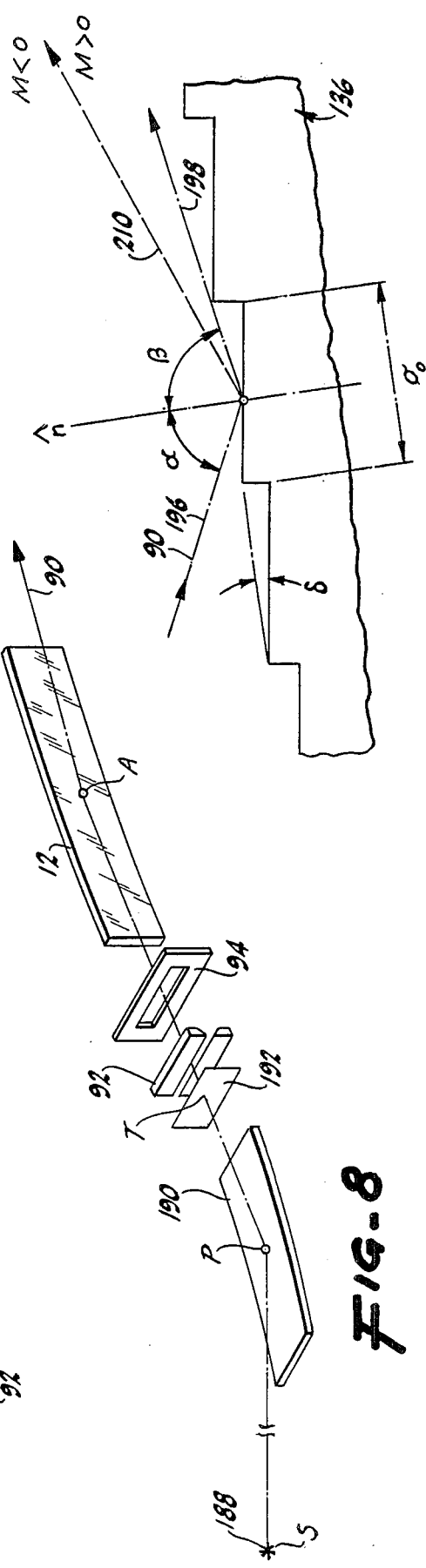

OPTICAL SYSTEM FOR HIGH RESOLUTION SPECTROMETER/MONOCHROMATOR

STATEMENTS AS TO RIGHTS OF INVENTION MADE UNDER FEDERALLY SPONSORED RESEARCH AND DEVELOPMENT

The United Stated Federal Government has rights to this invention pursuant to Contract No. DE-AC03-76SF00098, awarded to the University of California by the United States Department of Energy.

BACKGROUND OF THE INVENTION

The present invention relates to a novel optical system for a spectrometer or monochromator which is particularly useful in analyzing soft x-ray and extreme ultraviolet regions, 5–1000 angstroms, of the spectrum.

Spectrometers and/or monochromators generally employ a diffraction grating reflecting electromagnetic radiation ranging in wavelength from the infrared to the soft x-ray regions thereof, approximately 10,000 angstroms to 5 angstroms. Early spectrometer instruments used the Rowland grating which was spherical. Such gratings are still in common use. The grooves in the Rowland grating are ruled in equal intervals from each other along the chord of the surface. An entrance slit and the spectrum produced by the Rowland grating lie on a circle having a diameter equal to the radius of the grating curvature. Thus, the grating functions to focus and disperse the light emanating from a source. At wavelengths below approximately 1,000 angstroms, the angle of incidence of such radiation must be high to provide sufficient reflection efficiency. In other words, the grazing angle to the surface of the diffraction grating must be quite low to provide high reflection efficiency. Unfortunately, the Rowland circle geometry governing the Rowland grating requires that the detector employed therewith be positioned at a low grazing angle to the diffracted rays. This oblique detector orientation generally results in low detection efficiency and requires a long detector length to record spectra. In addition, as a monochromator, wavelength selection requires movement of either the entrance slit or exit slit along the Rowland circle. Finally, the spherical grating at grazing incidence results in unuseable spatial resolution perpendicular to the dispersion. In other words, the Rowland grating produces a large degree of astigmatism.

U.S. Pat. No. 4,398,823, issued to Brown et al, discloses a scanning monochromator which maintains a fixed exit slit. However, the Brown "Grasshopper" monochromator requires that the entrance slit and grating be repositioned in a complicated mechanical motion according to the wavelength of the radiation being scanned. The Brown device also exhibits the focal curve from the spherical grating which lies at a grazing angle relative to the principal ray in the Rowland format.

It is desirable to obtain extremely high spectral and spatial resolution when analyzing soft x-ray and extreme ultraviolet radiation as a source. Spectral resolution should equate to resolving powers of 1,000 to 30,000. Further, a spatial resolution of less than one millimeter is typically required. Moreover, electronic detection systems of contemporary design require a normal incidence spectrum orientation. Also, large and immovable light sources such as synchrotron radiation, laser produced plasmas, and the like, and sophisticated detectors require fixed entrance and exit planes. In addition, most spectrometers and monochromators for these radiation sources are used in ultra-high vacuums. Thus, a simple mechanical motion for tuning the wavelength of a spectrometer/monochromator would be a favorable feature.

Articles by Fonck and Kita separately describe holographically fabricated gratings and mechanically ruled gratings, respectively, which possess groove spacings having varying distances from one another. Oblique spectrum orientation produced by the prior art has been eliminated by the use of such gratings. Further, replacing a spherical grating surface by a toroidal surface with a small minor radius removes astigmatism according to the Fonck et al article. However, the modifications reported by Fonck, Nagata, and Kita eliminating oblique spectrum orientation result in degraded spectral resolution. In addition, the systems proposed by Fonck and Kita, as well as the Rowland grating require movable slits or complicated scanning motions to tune the wavelength of the exit spectrum while maintaining high spectral resolution. As prior discussed, these requirements present a substantial disadvantage with modern large and immovable light sources. An article by Monk proposes using converging light with a planar grating having equally spaced grooves or rulings. However, the system by Monk results in considerable astigmatism at such grazing incidence angles. Also, U.S. Pat. No. 2,995,973, issued to Barnes et al, employs a prism encapsulating a grating where the light source converges and strikes the grating at normal incidence angles. Again, this device does not reflect a significant amount of the electromagnetic radiation in the 5–1,000 angstrom range. An article by Murty puts forth the use of a plane grating having hyperbolic rulings, which is useable at normal incidence angles.

U.S. Pat. No. 4,492,466, issued to Aspnes, teaches a cylindrical grating having variable grooved spacing which slides parallel to the rotational symmetry axis for the purposes of focusing the light upon the same. Light entering the Aspnes device is divergent when it strikes the grating surface. The Aspnes device is restricted to use as a monochromator, and to slowly diverging light, such as light produced by synchrotron radiation in the vacuum ultraviolet region.

U.S. Pat. No. 4,192,994 to Kastner teaches the construction of a focusing device with substantially constant spaced grooves on an aspherical surface.

U.S. Pat. No. 4,312,569 to Harada teaches the reduction of aberrations of a single concave grating having varied groove spacings, produced by a mechanical ruling engine, and accepting divergent light.

Recent developments proposed by Hettrick et al propose the use of focusing mirrors with variable groove or line spacing gratings. However, these systems have not been tunable at high spectral resolution. Hettrick et al has also proposed the use of an aspherical telescope mirror to provide a convergent beam used in conjunction with plane reflection gratings. An erect field spectrometer employing plane, varied-spaced gratings at a grazing angle in a beam converging to a point focus was employed by Hettrick et al. In this case, the point-converging beam was provided by an aspherical telescope. Lai et al have proposed the use of an aspherical mirror in combination with an improved curved groove "Type V" holographic grating. U.S. Pat. No. 4,012,843 issued to Harada et al shows a tool for ruling grating grooves which may have varied spacings. Harada et al describes the use of a grazing incidence monochromator having a varied-space plane grating used in divergent light in conjunction with a plane mirror, which may be translated and rotated by a cam mechanism. The grating is also rotated by a sine-bar mechanism.

Kirkpatrick and Baez combined two spherical or cylindrical mirrors, one placed orthogonally relative to the other, to deliver a high resolution image projected on a film or other detector for the study of microscopic objects using x-rays. It should also be noted that Underwood has shown the use of a bent, initially flat glass or metal strip for use as a glancing incidence x-ray optical element.

A spectrometer or monochromator which employs a varied-spaced grating to produce an erect field spectrum and which is easily tuned to a particular wavelength using a simple mechanism would be a great advance in the field of optics.

SUMMARY OF THE INVENTION

In accordance with the present invention, a novel and useful optical system for a spectrometer or monochromator, which is particularly useful for analyzing soft x-rays and extreme ultraviolet wavelengths is provided.

The system of the present invention may utilize a first mirror in conjunction with a source of electromagnetic radiation. The first mirror in a concave configuration receives the electromagnetic radiation to converge in a first plane and may be formed of a flexible member having a specular surface. Means would also be provided for bending the flexible member to produce a curved specular surface.

A second concave mirror is also employed and receives the convergent beam from the first mirror in its concave mode. The second concave mirror reflects the received electromagnetic radiation in a converging beam in a second plane. The first and second planes and the first and second concave mirrors are substantially orthogonally positioned relative to one another. Means may also be included for precisely adjusting the graze angle of the second concave mirror. The convergent light beam from the second concave mirror is fed to a diffraction grating to produce a spectrum which may be captured or otherwise employed by detection means. The diffraction grating includes a reflecting surface having a plurality of straight parallel grooves which are spaced a varying distance from one another. The grating may be planar or possess a slight curvature. In addition, a second diffraction grating may be placed in side-by-side configuration with a first diffraction grating. In this case, means would be existent for shifting or moving the first and second diffraction gratings transversely relative to the convergent light beam coming from the second mirror. Thus, the first or second diffraction grating would be positioned to intercept the convergent light beam and produce a spectrum, over wavelength regions determined by the respective grating spacing.

Where the source is small, a pre-mirror may precede the entrance slit. In the case where an exit slit is employed, the spectrometer would then be strictly classified as a monochromator.

The system of the present invention may additionally comprise entrance and exit slits to intercept the electromagnetic radiation entering and leaving the optical system, respectively. Further, a light baffle may be interposed the entrance slit and the first mirror. Such a baffle may be required to under-illuminate the optical system. In addition, a filter may be employed to filter the light source near the entrance or exit slit.

It may be apparent that a novel and useful optical system which may be employed as a spectrometer or monochromator has been described.

It is therefore an object of the present invention to provide an optical system for a spectrometer or monochromator which possesses an exceptional capability to operate with a source of soft x-rays and/or extreme ultraviolet rays.

Another object of the present invention is to provide an optical system useable in a spectrometer having elements that operate efficiently at grazing angles of incidence.

It is another object of the present invention to provide an optical system for a spectrometer which possesses high resolution.

Another object of the present invention is to provide an optical system for a spectrometer which delivers an erect spectrum containing stigmatic images.

Yet another object of the present invention is to provide an optical system for a spectrometer which may be easily tuned such that a particular wavelength of the spectrum will strike the center of a fixed detector.

Another object of the present invention is to provide an optical sytem for a spectrometer which may be easily transformed into a monochromator by the simple insertion of a fixed exit slit at the detector.

A further object of the present invention is to provide an optical system for a spectrometer or monochromator which employs simple optical surfaces which are economical to manufacture without sacrificing high resolution.

Another object of the present invention is to provide an optical system for a spectrometer which employs straight grating grooves on the grating surface, thus, greatly simplifying manufacturing methods in the production of such a spectrometer or monochromator.

Another object of the present invention is to provide an optical system for a spectrometer or monochromator where the principal ray at all tuned wavelengths passes through an exit slit in a fixed direction or hits detection means at a fixed angle.

Another object of the present invention is to provide an optical system for a spectrometer or monochromator where the principal incident ray from the source may be essentially parallel to the principal exiting ray.

Another object of the present invention is to provide an optical system for a spectrometer or monochromator which may include an easily replaceable first optical component which is susceptible to contamination by the source of radiation.

The invention possesses other objects and advantages especially as concerns particular characteristics and features thereof, which will become apparent as the specification continues.

BRIEF DESCRIPTION OF THE DRAWINGS

FIG. 1 is a top plan view of the mechanical assembly of an embodiment of the present invention.

FIG. 2 is a side elevational view of the mechanical assembly of an embodiment of the present invention.

FIG. 6 is a top plan schematic view of the optical configuration of the embodiment of the present invention depicted in FIGS. 1-5.

FIG. 7 is a side schematic view of the optical configuration of the embodiment of the invention depicted in FIGS. 1-5.

FIG. 8 is a top right perspective view of a portion of another embodiment of the present invention.

FIG. 9 is a magnified broken sectional view of a portion of the grating shown in FIGS. 6 and 7.

For a better understanding of the invention reference is made to the following detailed description of the preferred embodiments thereof which should be referenced to the hereinabove described drawings.

DESCRIPTION OF THE PREFERRED EMBODIMENTS

Various aspects of the invention will evolve from the following detailed description of the preferred embodiments thereof which should be taken in conjunction with the hereinbefore described drawings.

Figure 5:
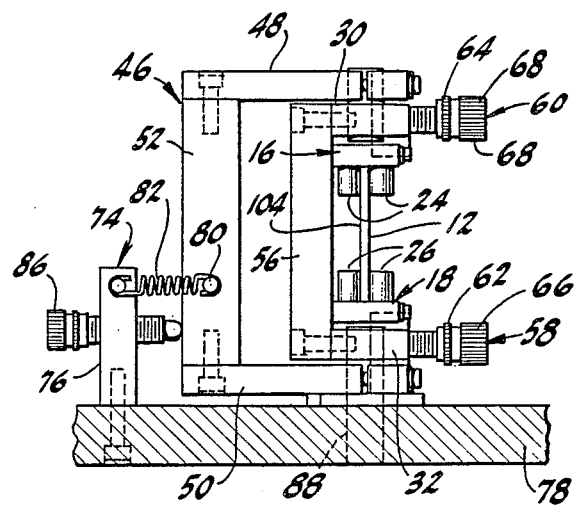
FIG. 5 is a left end view of the embodiment shown in FIG. 2 taken along line 5—5 of FIG. 2.

The invention as a whole is shown in the drawings by referenced character 10. Optical system 10 may be employed in a spectrometer, used in its broadest meaning herein to include a strictly defined spectrometer or a monochromator. The optical system 10 includes as one of its elements a first mirror 12, shown as being concave, in FIG. 2. Mirror 12 may be constructed of polished metal or glass which is flexible and bendable. Mirror 12 mounts within mirror bender apparatus 14, as shown in FIGS. 1, 2 and 5. Apparatus 14 may be a model AMA-250 manufactured by Acton Research Corporation, Acton Massachusetts and designed by Underwood and Hettrick. Apparatus 14 includes four holders 16, 18, 20, and 22. Each holder includes a pair of pins. For example, holders 16 and 18 include pairs of pins 24 and 26. Each pair of pins in each holder straddles mirror 12. Thus, mirror 12 is easily removable from holders 16, 18, 20, and 22. Holders 16, 18, 20, and 22 are fastened to blocks 30, 32, 34, and 36, respectively. Flexure hinges 38, 40, 42, and 44 permit rotation of blocks 30, 32, 34, and 36, respectively relative to frame 46 and may be of the cantilever type, Model No. 5000 series, ½ inch, Manufactured by Bendix Electric and Fluid Power Division. Frame 46 includes upper portion 48, lower portion 50, and back portion 52. Triangular-shaped arms 54 and 56 fix to blocks 30, 32, 34, and 36. Fine pitched screw mechanisms 58 and 60 fasten to upper portion 48 and lower portion 50, respectively, of frame 46. Mechanisms 58 and 60 include screws 62 and 64, respectively, having knobs 66 and 68. The ends of screws 62 and 64, opposite knobs 66 and 68, contact triangular-shaped arms 54 and 56 respectively. Thus, turning screws 62 and 64 inwardly will cause triangular-shaped arms 54 and 56 and holders 16, 18, 20, and 22 to rotate and contact the ends 70 and 72 of mirror, 12 resulting in the bending of the same.

Screw mechanism 74, FIG. 1, includes a block 76 which is fastened to base plate 78. Peg 80 fixes to back 52 of frame 46 and serves as an anchor for spring means 82 which connects to shaft 84 of block 76. A threaded screw 86 threadingly engages block 76 and contacts back 52 of frame 46. Mirror bender apparatus 14 rotates on a pivot pin 88 which extends into base plate 78. Thus, the graze angle at which incident light strikes mirror 12 may be adjusted. In this regard, principal ray 90 is shown in FIGS. 1 and 2 as emanating from an entrance slit 92 and passing through aperture stop 94 before striking first mirror 12.

It sould be noted that baseplate 78 mounts on the surface of vacuum enclosure 96 by employment of adjustment sets 98, 100, and 102 which contact the inner surface 103 of vacuum enclosure 96 and extend therein for lateral stability.

Mirror 12 is generally a flexible body 104 carrying a specular surface 106. Means 14 for bending flexible body 104 sets a nominal radius of curvature, as well as, smooth variations of this radius of curvature across the length of mirror 12. The beam exiting mirror 12 is converging in nature but parallel to the plane of FIG. 1, when mirror 12 is bent to a concave shape relative to principal ray 90. In this regard, mirror 12 could be flat, or bent to a concave or a convex shape. Thus, first mirror 12 controls astigmatism. In the embodiment depicted in the drawings, glass mirror 12 bent concavely reflects in the direction perpendicular to dispersion. Although, mirror 12 may be constructed of low quality glass, this factor does not degrade performance as only modest spatial resolution is required. An inexpensive strip of commercial float glass may be used, polished only along its edges to remove scratches to prevent the glass from fracturing during bending. The nature of the bending mechanism, described heretofore, allows member 104 to be easily replaced if contaminated by source 174. For this reason, mirror 12 is illustrated as the first optical surface in the system, except when pre-mirror 190 is employed. In practice, mirror 12 is optional and may be placed anywhere between source 174, 188 and detection means 178. Needless to say, mirror 12 may be constructed of a high quality polished metal mirror or ground and polished glass mirror in place of the bendable glass mirror.

Figure 4:
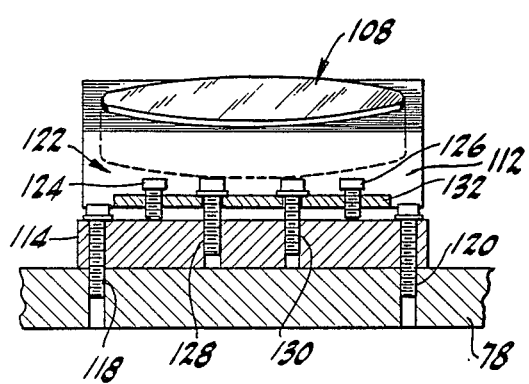
FIG. 4 is a sectional view taken along line 4—4 of FIG. 2.

Principal ray 90 leaves mirror 12 and next strikes spherical mirror 108 which is supported by mount 110. In general, spherical mirror 108 is of very high quality, being constructed of ground and polished glass. Mirror 108 has been oriented substantially orthogonally relative to first mirror 12. Principal ray reflected from mirror 108 is converging in the plane of FIG. 2. As may be apparent, mount 110 includes a pedestal 112. Pedestal 112 is hingedly attached to block 114 by hinge means 116. Block 114 is fixed to base plate 78 by the use of pairs of fastening bolts 118 and 120, FIG. 4. Means 122 is also included for adjusting the orientation of second mirror 108. With reference again to FIG. 4, means 122 takes the form of a pair machine screws 124 and 126 which move or rotate mirror 108 upwardly. Conversely, machine screws 128 and 130, which threadingly engage block 114 move or rotate mirror 108 downwardly. It should be noted that machine screws 124 and 126 threadingly engage flange 132 which extends from pedestal 112.

Figure 3:
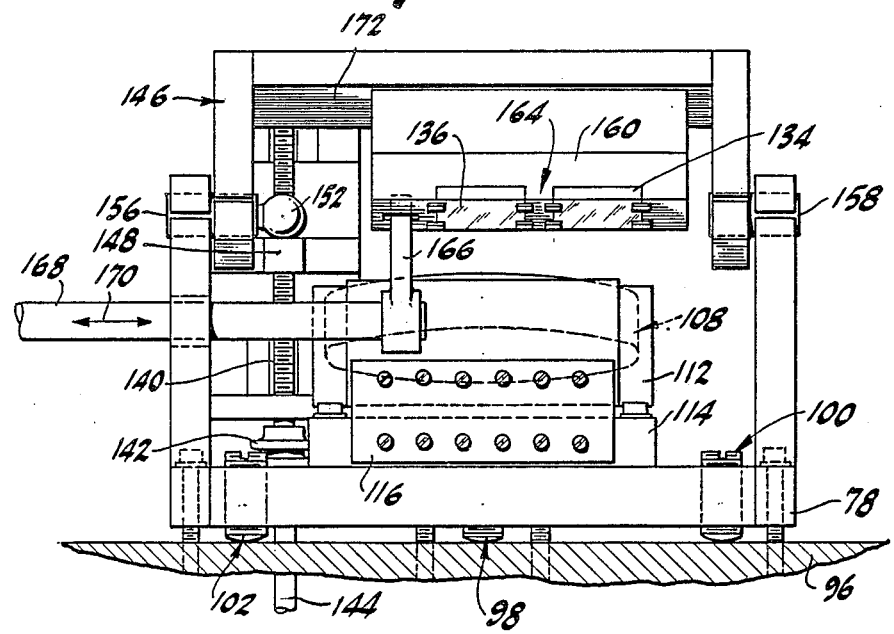
FIG. 3 is an end view taken along line 3—3 of FIG. 2.

After reflection from second mirror 108, principal ray 90 travels to any one of a pair of diffraction gratings 134 and 136. As depicted in FIGS. 1-3, diffraction grating 136 is employed in conjunction with principal ray 90. Gratings 134 and 136 may be planar and have varied-spaced rulings. the incident angle upon the gratings 136 is at its center. Means 138 is employed to co-rotate gratings 134 and 136, although, only one grating is positioned to receive electromagnetic radiation reflected from mirror 108. As a consequence, light reflected by mirror 108 strikes grating 136 (as depicted) at its center and the wavelength diffracted along principal ray 90 is set by rotation means 138. Rotation means 138 includes as one of its elements a lead screw 140, which is coupled to bellows or gearing 142, and feedthrough 144 which passes out of encompassing vacuum enclosure 96. Bellows 142 transmits accurate rotational motion to lead screw 140 without transmission of any longitudinal motion due to atmospheric pressure outside of vacuum enclosure 96. Lead screw 140 threadingly engages a slide 146 which is bolted to pusher plate 148, FIGS. 2 and 3. Upper surface 150 of pusher plate 148 contacts a spherical ball 152 which is connected to sine-bar 154. When principal ray 90 is the zero order of diffracted light, the center of spherical ball 152 and the center of flexure hinges 156 and 158 lie in a plane which is perpendicular to the axis of lead screw 140. Also, the wavelength diffracted along principal ray 90 will then be linearly proportional to the number of turns of rotation of feedthrough 144. Slide 146 may be of the type identified as model number 2020 manufactured by Micro Slides, Inc. of Deerpark N.Y.

Gratings 134 and 136 are mounted in a grating frame 160 having springy backing member 162 and plurality of tabs 164 on the front side of the frame. The gratings register against the tabs due to the pressure of springy backing member 162. Frame 160 is linked to a changing arm 166 which, in turn, is connected to rod 168. As depicted in FIG. 3, changer rod 168 moves along directional arrow 170. Frame 160 is bolted or otherwise fixed to slide mechanism 172 such as model number 3060 manufactured by Micro Slides, Inc., Deerpark N.Y. Changer rod 168 extends through vacuum enclosure 96 in a feedthrough arrangement (not shown) which seals optical system 10 against leakage of atmospheric gases into enclosure 96. Thus, grating 134 and 136 are mounted with their optical surfaces facing downwardly, FIG. 2. For example, grating 134 may have the same geometry and specification as grating 136 except with a ruling spacing larger by factor of 2 or 3. The user could very easily determine which grating is to be used in conjunction with electromagnetic radiation reflecting from second mirror 108. A simple movement of rod 168 according to directional arrow 170 would place either grating 134 in the desired position to intercept principal ray 90.

Optical system 10 is also equipped with window 172 which permits alignment of the principal ray 90 of optical system 10 i.e., a light source is directed through window 172 in the reverse direction of principal ray 90. Adjustment screws 98, 100, and 102 are manipulated to bring principal ray to entrance slit 92.

With reference to FIGS. 6 and 7 it may be observed that a schematic representation of optical system 10 is depicted therein. Optical system 10 includes a source of electromagnetic radiation 174 which passes through entrance slit 92 and thereafter through light baffle 94, such as a model 3013, distributed by Blake Industries Inc., Scotch Plains, N.J. First and second mirrors 12 and 108, respectively, focus the radiation coming from source 174 into converging rays within orthogonally oriented planes. It should be noted that first mirror 12 has been bent into a concave configuration. Grating 136 may be rotated according to directional arrow 176 to obtain the desired diffracted wavelength at detector means 178, FIG. 11, which will be explained hereinafter. FIG. 6 depicts a plurality of rays 180 in this regard. With reference to FIG. 7 it may be seen that grating 136 includes an optical center 182. w represents the distance from pole G on axis 184, parallel to plurality of grating rulings 186, to the center of any single grating ruling. The symbol ($\sigma$w) represents the grating spacing at distance w.

With reference to FIG. 8 a small source of electromagnetic radiation 188, including light, is depicted. A pre-mirror 190 is employed to increase the light gathering power or resolution of the optical system, or a spectrometer or monochromator employing optical system 10. Light reflected from pre-mirror 190 passes through filter 192, entrance slit 92, light baffle 94, and the strikes first mirror 12 shown in a concave configuration.

FIG. 9 represents a magnification of grating 136. $\hat{n}$ represents the surface normal of the grating. The following symbols identified as follows:

$\phi_P$-Pre-mirror angle of incidence and reflection.

$\phi_A$-Astigmatism control mirror angle of incidence and reflection.

$\phi_C$-Converging mirror angle of incidence and reflection.

$\alpha$-Grating angle of incidence.

$\beta$-Grating angle of diffraction along principal ray (on-axis) of wavelength ($\lambda$)

$\beta'$-Grating angle of diffraction for an off-axis wavelength ($\lambda'$)

$\phi_D$-Detector angle of incidence.

$R_A$-Radius of mirror 12

$R_C$-Radius of mirror 108

$R_G$-Radius of grating 136.

The above angles are measured relative to principal ray to $\hat{n}$.

The following point designations are also noted on the drawings and are identified as follows;

S-Light source 174, 188
P-Pole of pre-mirror
T-Transmission filter 192
E-Entrance slit 92
B-Aperture Baffle 94
A-Pole of astigmatism control mirror 12
C-Pole of converging mirror 6
G-Pole 182 of grating 136
V-Grating 136 virtual object point
I-Grating stigmatic image point
X-Exit slit 194
O-Detection means 178 off-axis point.

The above points represent critical locations in the optical system 10 and are generally points at the center of each optical component through which principal ray 90 passes or comes in contact. Distances, therefore, between these points are along the path defined by the principal ray 90. For example, $\overline{SE}$ denotes the distance between source 174, 188 and entrance slit 92.

The following magnifications are of interest from object to image:

$$M_A = \overline{AI}/\overline{SA} \qquad \text{(i)}$$

$$M_c = \overline{CV}/\overline{EC}$$

$$M_G = \frac{\overline{GI}/\cos\beta}{\overline{GV}/\cos\alpha}$$

Returning to FIGS. 6-9 and FIG. 11, an incident photon is produced by light source 174, 188 and may be of any nature. Light provided by source 174, 188 enters entrance slit 92 possessing knife edges which define a narrow vertical width in FIG. 6. Entrance slit 92 serves as a gate to the optics of system 10. The light or electromagnetic radiation next encounters aperture baffle 94 which serves to define the illuminated apertures of the remaining optical components of system 10. Bendable mirror 12 in its concave mode reflects light into a horizontal focus (normal to dispersion) at a chosen distance along principal ray 90. Optional mirror 12 controls the astigmatism of optical system 10. Mirror 108 which is preferably spherical is oriented orthogonally to mirror 12 and reflects the light received from mirror 12 into a vertical focus at position V, FIG. 11. Position V becomes the virtual object position in the dispersion direction for the diffraction grating 136. A combination of mirrors 12 and 108 represent a two-dimensional crossed focusing system accordingly to the geometry first purposed by Kirkpatrick and Baez, heretofore discussed. In the configuration shown on FIGS. 6-9 and FIG. 11, mirrors 12 and 108 provide a convergent light beam to a plane reflection grating 136 having varied-spaced grooves. Grating 136 in this configuration possesses a unique focusing property. The magnitude of the wavelength which travels along principal ray 90 to detection means 178 after dispersion is determined by the angle at which principal ray 90 strikes grating 136 at its center G. Means 138, heretofore described, determines this angle. Detector 178 is oriented substantially (within approximately 45 degrees, $\phi_D$) normal to the principal ray 90 and records a spectrum of wavelengths which are focused and dispersed along a vertical line which coincides with line 178 depicted in FIG. 11. Exit slit 194 may be employed in conjunction with detection means 178 to produce a monochromator. In this monochromator mode, optical system 10 transmits only one wavelength per setting of the grating angle. A pre-mirror 190 may be inserted between the source 188 and entrance slit 92, as heretofore noted. Transmission filter 192 would limit the range of wavelengths which may pass into optical system 10 or into detection means 178. Filter 192 is an ultra-thin film (0.01-1 micron thickness). Filter 192 is generally supported by wire meshes. To prevent diffraction from these meshes from degrading the spectral resolution, the filter should be placed either near entrance slit 92

$$\left(\overline{ET}/\Delta E < < \frac{t}{\lambda}\right)$$

or detection means 178

$$\left(\overline{TI}/\Delta E < < \frac{t}{\lambda}\right),$$

where t is the width of the opaque wires in the mesh.

It should be noted that most prior art systems directed diverging light into gratings in the dispersion plane. To keep fixing the slits in the principal ray direction, yet maintain high spectral resolution over a broad wavelength range is important. Fermat's rule states that a light ray will trace a path through a optical sytem so as to minimize its time of travel. For travel within a medium of constant refraction index, this requires a minimum effective path-length. This path-length equals the physical path-length traversed minus a phase term equal to a integer (m) number of wavelengths per groove for a diffraction grating. The result of this rule is maximum constructive interference for diffracted waves and a well defined image. In theory, one can always obtain perfect constructive interference, and thus a point image (i.e. free of aberrations) by placing the grating grooves such that two conditions are satisfied between an object and an image. The first condition is that the physical path-length jumps by m wavelengths between adjacent grooves. The second condition is that the physical path-length is a constant along any groove. The first of these conditions requires a variable spacing between the grooves of a grating. Prior art plane gratings have been placed at a grazing angle in a beam converging to a point focus. This prior art system assumed that some optic located prior to the grating provided a point image as an object for the grating. The distance $\overline{GV}$ from the grating 136 center to the virtual object point was set equal to the distance $\overline{GI}$, the distance from the grating center to a real image point at a chosen wavelength. For example, FIG. 1 depicts these distances relative to grating 136. The required spacing for each groove along the ruled width was determined from well known grating equations. These prior art systems resulted in stigmatism at the wavelength of choice, and a spectrum which was well-imaged upon a detector surface oriented perpendicularly to the image beam. The point-converging beam in this prior art system was provided by an aspherical telescope.

The second condition for perfect constructive interference in the image requires curved grooves which are very different to manufacture. The use of straight grooves as provided by a mechanical ruling in this system limits the resolving power accordingly to the formula 8 $f_y^2$, where $f_y$ is the beam speed along the length of the grooves which is the reciprocal of the cone angle of the convergent beam.

The present invention obtains high resolution using a varied spaced plane grating in converging light with a high resolution image (physically small). This factor prevents an overlap of the otherwise spectrally resolved images at the focal plane of the grating. The prior art resolution obtained using aspherical mirrors is severely limited by methods of manufacturing and testing. The use of mirrors 12 and 108 has been found to deliver a high resolution image which may be use as a object point for the grating 136. The equation governing this high resolution focusing by mirror 108 is as follows:

$$1/\overline{EC}+1/\overline{CV}=2/(R_c \cos \phi_c) \quad (1)$$

Using unit magnification in the above equation minimizes the aberrations from an optic constructed thereto. The result is a minimum size image at point V which may used by grating 136 as its virtual object.

Since mirror 12 focuses light in a direction perpendicular to dispersion it serves only to control the amount of astigmatism. Mirror 12 need not obtain as high a resolution as mirror 108 in this regard. Thus, the bendable glass mirror employed in the embodiment shown in the drawing may be relatively long and results in a large collection area. By employing means 14 for bending mirror 12, the desired focusing perpendicular to dispersion at the image plane may be experimentally obtained.

Mirrors 12 and 108 of optical system 10 may, in general focus between different object and image points. This factor permits more aberration correction than prior art systems. This may be apparent if a point is considered as the single object for the mirror system at the center of entrance slit 92. Mirror 12 forms a line image whose length is in the vertical direction through spectrum image I, FIG. 11. Converging mirror 108 forms a line image whose length runs in a horizontal direction perpendicular to the plane of FIG. 11 through virtual object position V of grating 136. By permitting $\overline{GI}$, to be different from $\overline{GV}$, an extra degree of freedom is obtained which, by the application of Fermat's rule allows additional aberration correction.

For example, if grating 136 is rotated for selection of the wavelength striking fixed image position I at detector 178, the grating must be rotated so that the angle of incidence for the principal ray is:

$$\alpha = \theta - \arcsin\left[\frac{m\lambda}{2\sigma_o\cos\theta}\right] \quad (2)$$

Where is the tuned wavelength, m is the spectral order, is the spacing at the central groove and the fixed angle is included between the principal rays of incidence and diffraction 196 and 198, FIG. 9, which constitute principal ray 90, heretofore described. The angle of diffraction $\beta$ is therefore $2\theta-\alpha$. Consider two wavelengths of choice $\lambda_1$ and $\lambda_2$. Equation (2) then specifies the angles $\alpha_1, \beta_1, \alpha_2$ and $\beta_2$. Then, by application of Fermat's rule, we find maximum spectral resolution is obtained at these two wavelengths, which alternately pass through position I, FIG. 11, as grating 136 is rotated, if:

$$\overline{GV}/\overline{GI} = \frac{\cos^2\alpha_2(\sin\beta_1 - \sin\alpha_1) - \cos^2\alpha_1(\sin\beta_2 - \sin\alpha_2)}{\cos^2\beta_2(\sin\beta_1 - \sin\alpha_1) - \cos^2\beta_1(\sin\beta_2 - \sin\alpha_2)} \quad (3)$$

Figure 10:
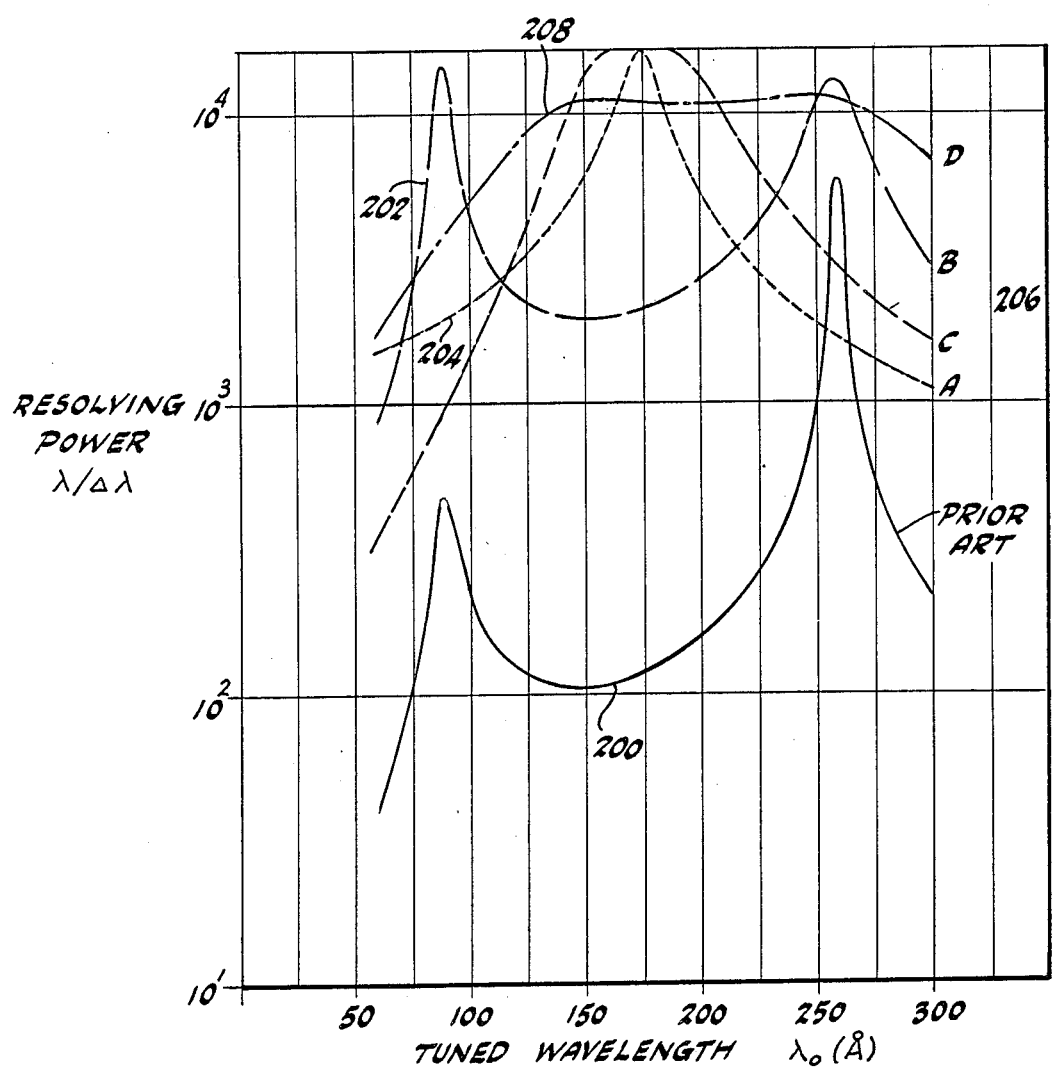
FIG. 10 is a graph depicting the resolving power for a particular tuned wavelength of embodiments of the present invention and in prior art systems.

With reference to FIG. 10, Curve 202 represents the resolving power versus wavelength tuned by simple rotation of a 1200 g/mm grating about its pole for the present optical system 10. Curve 200 represents the result in conjunction with the first outside order of a spectrum produced by a prior art spherical grating. As may be apparent, optical system 10 exhibits superior resolving power over the prior art represented by curve 200. For example, curve 202 (where $\overline{GV} > \overline{GI}$ from equation 3) shows a factor of 20 increase over the prior art where $\overline{GV}$ is greater than $\overline{GI}$. When $\overline{GV}$ is set equal to $\overline{GI}$ we find curve 204 which again reveals substantial improvement over the prior art. Curve 204 was chosen to be optimized at a wavelength of approximately 175 angstroms.

The tuning region for which high resolution is obtained in the vicinity of a single chosen wavelength may be significantly widened by choosing:

$$\overline{GV}/\overline{GI} = \frac{\cos^2\alpha_1(\cos\alpha_1 + \cos\beta_1) - 2\cos\alpha_1\sin\alpha_1(\sin\beta_1 - \sin\alpha_1)}{\cos^2\beta_1(\cos\alpha_1 + \cos\beta_1) + 2\cos\beta_1\sin\beta_1(\sin\beta_1 - \sin\alpha_1)} \quad (4)$$

Curve 206 shows that a resolving power in excess of 10,000 can be obtained over a 50 angstrom region centered at 175 angstroms.

Figure 11:
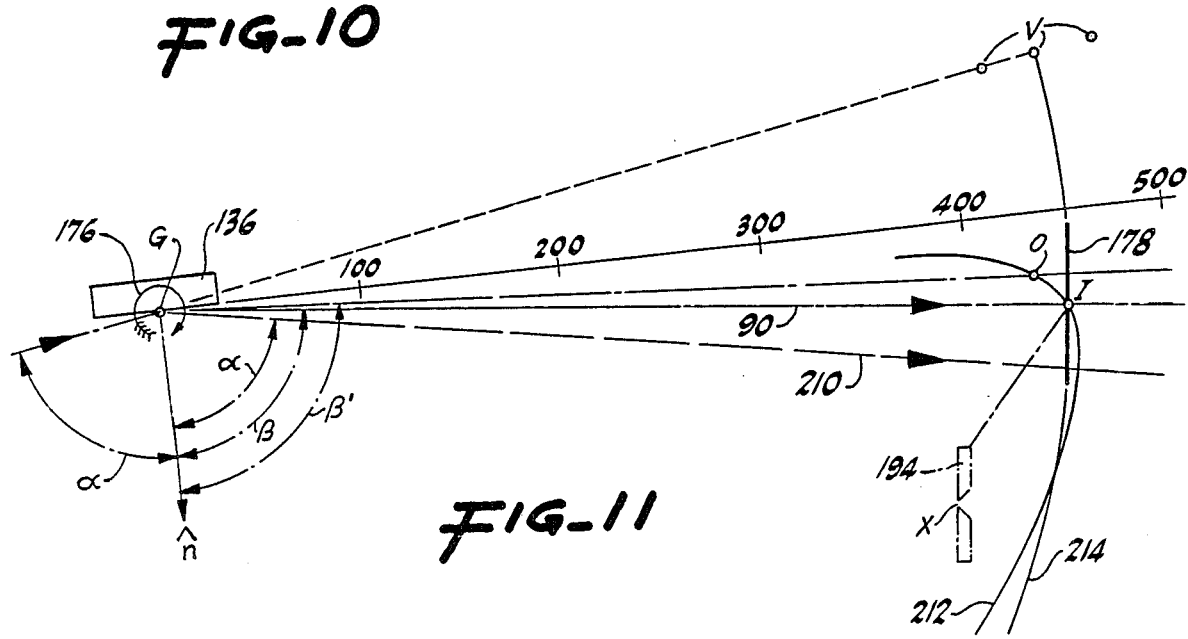
FIG. 11 is a schematic view depicting the grating used in FIGS. 6 and 7 as well as rays passing from the grating to the plane of the detection means.

The high resolution tuned region may be further widened by deviating slightly from the employment of a plane grating surface shown on grating 136. Choosing a spherical grating surface with a radius and object and image distances as follows:

$$\overline{GV}/R_G = \frac{b_1a_2 - b_2a_1}{b_2c_1 - b_1c_2}; \quad \overline{GI}/R_G = \frac{b_1}{c_1 + a_1R_G/\overline{GV}} \quad (5)$$

where:

$a_1 = -\cos^2\alpha_1(\cos\alpha_1 + \cos\beta_1) + 2\cos\alpha_1\sin\alpha_1(\sin\beta_1 - \sin\alpha_1)$ $a_2 = -\cos^2\alpha_1(\sin\beta_2 - \sin\alpha_2) + \cos^2\alpha_2(\sin\beta_1 - \sin\alpha_1)$ $b_1 = -\cos^2\beta_1(\cos\alpha_1 + \cos\beta_1) - 2\cos\beta_1\sin\beta_1(\sin\beta_1 - \sin\alpha_1)$ $b_2 = -\cos^2\beta_1(\sin\beta_2 - \sin\alpha_2) + \cos^2\beta_2(\sin\beta_1 - \sin\alpha_1)$ $c_1 = -2(1 - \sin\beta_1\sin\alpha_1 + \cos\beta_1\cos\alpha_1)$ $c_2 = (\cos\alpha_2 + \cos\beta_2)(\sin\beta_1 - \sin\alpha_1) -$ $(\cos\alpha_1 + \cos\beta_1)(\sin\beta_2 - \sin\alpha_2)$ Curve 208 shows a resolving power in excess of 10,000 over a tuning region 140 angstroms wide. The radius of curvature found by equation (5) may be negative or positive. A negative radius of curvature indicates that grating 136 having a spherical surface would be a convex surface. In this case outside spectral orders would be employed (m>zero). It should be noted that FIGS. 9 and 11 show zero order ray line 210. Inside spectral orders lie above zero order line 210 while outside spectral orders lie below zero order line 210, FIG. 9. Grating 136 would possess a concave surface to employ inside spectral orders (m<zero) as is indicated by equation (5).

Grating spacing for grating 136 is specified as a polynomial:

$$\sigma_w = [1/\sigma_o + \epsilon_1 w + \epsilon_2 w^2 + \epsilon_3 w^3 + ]^{-1} \quad (6)$$

where $\sigma w$ means sigma is a function of w and where the ruling coefficients $\epsilon_n$ are constants given by:

(7)

$\epsilon_1 = [(\cos\alpha_1/R_G + \cos^2\alpha_1/\overline{GV}) + (\cos\beta_1/R_G - \cos^2\beta_1/\overline{GI})]/(m\lambda)$ $\epsilon_2 = \frac{3}{2}\left[\frac{\sin\langle\alpha\rangle}{\overline{GV}}\left(\frac{\cos\langle\alpha\rangle}{R_G} + \frac{\cos^2\langle\alpha\rangle}{\overline{GV}}\right) - \right.$ $\left. \frac{\sin\langle\beta\rangle}{\overline{GI}}\left(\frac{\cos^2\langle\beta\rangle}{\overline{GI}} - \frac{\cos\langle\beta\rangle}{R_G}\right)\right]/(m\langle\lambda\rangle)$ $\epsilon_3 = -\frac{1}{2}\left[\frac{4\sin^3\langle\alpha\rangle}{\overline{GV}^2}\left(\frac{-\cos^2\langle\alpha\rangle}{\overline{GV}} - \frac{\cos\langle\alpha\rangle}{R_G}\right) + \right.$ $\left(\frac{\cos^2\langle\alpha\rangle}{\overline{GV}} + \frac{\cos\langle\alpha\rangle}{R_G}\right)^2/\overline{GV} -$ $\left(1/\overline{GV} + \frac{\cos\langle\alpha\rangle}{R_G}\right)/R_G^2 +$ $$\frac{4\sin^3\langle\beta\rangle}{\overline{GI}^2}\left(\frac{\cos^2\langle\beta\rangle}{GI}-\frac{\cos\langle\beta\rangle}{R_G}\right)-$$

$$\left(\frac{\cos^2\langle\beta\rangle}{GI}-\frac{\cos\langle\beta\rangle}{R_G}\right)^2/\overline{GI}+$$

$$\left(1/\overline{GI}-\frac{\cos\langle\beta\rangle}{R_G}\right)/R_G^2\bigg]/(m\langle\lambda\rangle)$$

where $\langle\lambda\rangle=(\lambda_1+\lambda_2)/2$ is the average value of $\lambda$ and where $\langle\alpha\rangle$ and $\langle\beta\rangle$ are specified by substitution of $\langle\lambda\rangle$ into equation (2).

For a spherical grating surface, equation 6 defines the spacing as projected along a chord tangent to the grating at its pole (w=0).

The optical system 10 of the present invention produces a spectrum that is well-focused upon detector 178 which is oriented perpendicularly to principal ray 90. With reference to FIG. 11, the geometry illustrated therein shows V as the virtual object for spectral (meridional) focusing. Applying Fermat's rule, the resolving power is maximized along the following (meridional) focal curve:

$$\overline{GO}/\overline{GV}=\cos^2\beta'/[f(\sin\beta'-\sin\alpha)+\cos^2\alpha] \qquad (8)$$

for a plane grating where $\beta'$ is the angle of diffraction for a wavelength off-axis $$\lambda'=\frac{\sigma_o}{M}(\sin\beta'-\sin\alpha)$$

(e.g. through point 0, FIG. 11), and where:

$$f=[(\overline{GV}/\overline{GI})\cos^2\beta_1-\cos^2\alpha_1]/(\sin\beta_1-\sin\alpha_1) \qquad (9)$$

For a spherical varied space-grating, as described above, the tangential focal curve is:

$$(\overline{GO}/R_G)= \qquad (10)$$

$$\cos^2\beta'/\left[g(\sin\beta'-\sin\alpha)+\frac{\cos^2\alpha}{\overline{GV}/R_G}+\cos\alpha+\cos\beta\right]$$

where $R_G$ is the grating radius of curvature and where:

$$g=\frac{-\cos^2\alpha_1/(\overline{GV}/R_G)+\cos^2\beta_1/(\overline{GI}/R_G)-(\cos\alpha_1+\cos\beta_1)}{\sin\beta_1-\sin\alpha_1} \qquad (11)$$

In FIG. 11, focal curve 212 is obtained from equations (8) and (9) using parameters for curve 202 of FIG. 10. Focal curve 212 is substantially perpendicular to the principal diffracted ray 90 over a wavelength region extending from the zero order ray 210 to beyond the central image point I.

For comparison, the sagittal focal curve 214 is also depicted along which astigmatism is zero. Sagittal curve 214 is essentially a circle centered at w=0 on the grating surface of grating 136. A detector 178 placed to coincide with sagittal curve 214 would experience no loss in resolving power relative to the optimum focal surface 212 provided that:

$$W_G(\overline{GO}/\overline{GI}-1)\cos\beta'<<\Delta D \qquad (12)$$

where $\Delta D$ is the unit detector resolution at detector 178. The inequality shown in equation 12 is met over a wide wavelength band due to the fact that meridional curve 212 makes and angle of less than 45 degrees to sagittal curve 214 when they intersect at stigmatic image point I. For comparison, a conventional spherical grating following the Rowland circle geometry would make an angle of approximately 88 degrees (grazing angle of 2 degrees) with the diffracted ray 90. This results in a significant departure from the sagittal focal curve for other wavelengths. It has been found in practice, that the optical system 10 of the present invention may employ a plane detector surface at detector 178 which approximately coincides with sagittal curve 214, FIG. 11. Alternately, detector 178 may be tilted at an angle $\alpha_D$ to the diffracted ray so as to more closely coincide with tangential focal curve 212 over a limited portion of the spectrum produced by grating 136.

The erect field property resulting from optical system 10 is particularly useful with contemporary electronic imaging devices such as channel plates, and streak cameras. The erect field property is also of advantage when the optical system 10 is used as a monochromator having exit slit 194. Tolerance for vertical alignment of the slit is greatly relaxed over those of the prior art spectrometers and monochromators employing oblique focal curves.

Although FIG. 10 does not include aberrations from mirror 108, resolution can be limited as a result of these aberrations. Setting the magnification of mirror 108 to unity (1.0) results in the minimization of the spherical aberration from mirror 108. Leaving this aberration uncorrected would cause grating 136 to see an infinitely narrow entrance slit broadened with wings which decrease in intensity as the ⅔ power of the distance from slit center E, with an extreme width equal to:

$$\Delta E_C = W_C^3 \cos\phi_C \sin^2\phi_C/4/\overline{EC}^2 \qquad (13)$$

Another, and perhaps more useful determinant, of the resolution is the full-width-at-half-maximum (FWHM). The FWHM is smaller by a factor of 8 from the equation (13) aberration. The FWHM may be balanced at wavelength $\lambda$ by adjusting the spherical aberration ruling coefficient $\epsilon_n$ previously given in equation 7, above:

$$\epsilon_3=\epsilon_3+\Delta\epsilon_3$$

where $\Delta\epsilon_3=-(\overline{CV}/\overline{GV}^4)\cos^4\alpha\tan^2\phi_C/(m\lambda) \qquad (14)$ Moreover, it may be seen by varying $\lambda$ (as well as $\alpha$ per equation (2)) that the correction term in equation (14) is nearly constant for all wavelengths. A typical correction term may be applied at all wavelengths of interest. Similar, but larger corrections may be applied when the magnification of mirror 108 is not unity.

Where mirror 108 is a sphere, mirror 108 may also control astigmatism in place of mirror 12. This is possible if the angle of incidence, $\alpha$ is near 0 degrees (normal incidence) rather than near 90 degrees (grazing incidence). For example, where the magnification of mirror 108 equals 1, then:

$$R_C = (\overline{GV} - \overline{GI})/[\cos\phi_C - 1/(2\cos\phi_C - 1/\cos\phi_C)] \quad (15)$$

or $$\phi_C \approx \arcsin\left[\frac{\overline{GI} - \overline{GV}}{2 R_C}\right]^{\frac{1}{2}} \text{ for } \overline{GI} > \overline{GV} \text{ and } \sin\phi_C << 1$$

where the distance $\overline{GI}$ sets the physical size of optical system 10 and where $\overline{GV}$ is specified by equations (3), (4), or (5). Since the radius of mirror 108 is greater than 0 (concave) to provide the convergent beam leaving mirror 108 lies in the dispersion direction of grating 136. In this case, equation (15) requires that $\overline{GI}$ be greater than $\overline{GV}$. This occurs from equations (3), (4), (5) if and only if, m is less than 0 (inside order). The use of a low incidence angle $\phi_C$ results in negligible spherical aberration from mirror 108. In addition, a spectrometer or monochromator system 10 may be constructed in a physically compact form. In otherwords, the incidence beam striking grating 136 has been redirected by approximately 180 degrees. However, the low incidence angle of light striking mirror 108 results in absorption of radiation having wavelengths shorter than approximately 200 angstroms. Using a multilayer coating 216 on the surface of mirror 108 aids in the efficient reflection of wavelengths over limited simultaneous bands (approximately 1–10 percent), in this regard. This coating is especially useful in the region of electromagnetic radiation having wavelengths of 20–200 angstroms. Coating 216 would consist of alternate layers of reflecting and transmitting materials.

The width of entrance slit 92, or the width of source 174, 188 without entrance slit 92, as well as the resolution at detector 178 (or width of exit slit 194 in the monochromator mode) must be set small enough to achieve the desired spectral resolution ($\Delta\lambda$). The entrance slit width must be:

$$\Delta E < \frac{|m|\Delta\lambda}{\sigma_o} \cdot \left[\frac{\overline{GV}}{M_C \cos\alpha}\right] \quad (16)$$

While the detector resolution must be:

$$\Delta D < \frac{|m|\Delta\lambda}{\sigma_o} \cdot \left[\frac{\overline{GI}}{\cos\beta}\right] \quad (17)$$

It should be noted that the values of $\alpha$ and $\beta$ are specified by equation 2. The use of inside spectral orders ($\alpha > \beta$) permits the entrance slit width to be greater than the detector resolution. The inverse is true for use of outside spectral orders. The number of grooves illuminated across the ruled width w of the grating 136 may also determine a limit to the attainable resolving power of a spectrometer monochromator employing optical system 10. The product of the spectral order and the number of grooves participating in the diffraction process equals the maximum resolving power which may be discerned. For example, where m=1 a resolving power 2000 requires at least 2000 grooves illuminated on grating 136. On the other hand the dominant aberration affecting the curves of FIG. 10 grow linearly in proportion to the ruled width of grating 136, resulting in an optimum grating width for highest spectral resolution.

The illumination of the desired amount of ruled width of grating 136 is accomplished most easily by the insertion of aperture stop 94 in optical system 10. Of course, the use of aperture stop 94 requires that the incident light striking aperture stop 94 would, otherwise, overilluminate optical system 10. In other words, the extreme ends of the intended illuminated width on grating 136 must be able to view light source 174, 188 through entrance slit 92 when that component is employed. If the physical extent of light source 174, 188 in the dispersion direction is $\Delta S$ and its distance from entrance slit 92 is $\overline{SE}$, then the maximum grating width which can be illuminated results in the following diffraction-limited resolving power:

$$(\lambda/\Delta\lambda)_S = \frac{|m|}{\sigma_o} \cdot \left[\frac{\Delta S}{\overline{SE}}\right] \cdot \left[\frac{\overline{GV}}{M_C \cos\alpha}\right] \quad (18)$$

Higher resolution in optical system 10 requires that a pre-mirror 190 be inserted between the source 188 and entrance slit 92. Pre-mirror 190 must have a magnification:

$$M_P < (\lambda/\Delta\lambda)_s/(\lambda/\Delta\lambda)$$

Pre-mirror 190 also increases the light gathering power of optical system 10 in the dispersion direction. The light gathering power is defined as the physical size of the source 188 times the angular spread of rays (radians) emanating from source 188 in passing through entrance slit 92 of optical system 10. After accounting for less than 100 percent reflectance of pre-mirror 190, the net gain in light gathering power is:

$$\text{GAIN IN THROUGHPUT} = \eta_P \overline{SE} \Delta\phi_C/\Delta S \quad (19)$$

Again, it is assumed that pre-mirror 190 will overilluminate entrance slit width 92.

In general, all the optical surfaces of the present invention should be coated with a material having a high reflection efficiency for wavelengths in the range of 5–1000 Angstroms. For example, gold, iridium, rhodium, osmium, or platinum, would suffice in this application.

With reference to FIG. 9, it may be observed that the grating grooves are triangular in profile with a minor "blaze" angle accordingly to the following relationship:

$$\delta = \arcsin\left[\frac{|m|\lambda_B}{2\sigma_o \cos\theta}\right] \quad (20)$$

where $\lambda_B$ is the wavelength (blazed) at which efficiency is maximized for particular blaze angle.

It is important to note that the fabrication of optical surfaces for use at short wavelengths will inevitably deviate from the intended surface shape required for highest resolution. For spherical mirror 108, the maximum tolerable vertical error is:

$$\Delta z < \frac{\lambda}{8}/\cos\phi_C \quad (21)$$

over the required diffraction-limited width, of:

$$W_{DL} > \left(\frac{\overline{EC}}{\Delta E}\right)\frac{\lambda}{\cos\phi_C} \tag{22}$$

The maximum tolerable vertical error, is:

$$\Delta z < \frac{\lambda}{4}/(\cos\alpha + \cos\beta) \tag{23}$$

Over the required diffraction-limited width of:

$$W_{DL} > \frac{\lambda}{\Delta\lambda}\left[\frac{\sigma_o}{|m|}\right] \tag{24}$$

It has been found that practically the present optical system requires only plane and spherical surfaces for reflection in the dispersion direction. These shapes for any mirror surface can be made to extremely accurate tolerances. However, aspherical mirror surfaces may be employed in the present invention if future manufacturing techniques permit such surfaces to be fabricated to higher tolerances. At present, the performances of optical system 10 is severely degraded by aspherical mirror surfaces as presently manufactured.

Angular alignment of mirror 108 may be easily achieved. The graze angle of mirror 108 must be adjusted while minimizing the physical size of its focused image after reflection by grating 136. Equations (3), (4), or (5) specify the position at which an alignment focal plane for mirror 108 should be situated when viewing the zero order reflection from grating 136. Alternatively, alignment sections may be ruled at the edges of grating 136 in order to provide a first order image in the visible light upon the focal plane passing through point I, use for obtaining the spectra. Such alignment sections may simply be a continuation of the ruling specified by equation (6), but with coefficients $\epsilon_n$ reduced by a factor equal to ratio of the alignment wavelength to the wavelength of use. A second alternative technique may be employed to effect alignment whereby every pth groove in the present grating is omitted during the ruling manufacturing process. This omission forces a 1/p harmonic image in the diffracted light from all parts of grating 136. Thus, a full grating aperture may be used to provide the alignment.

A grating may be fabricated according to the above equations for use in spectral order m. An inverted replica may be taken of such a grating. This inverted grating will also obey the same equations, including the proper blaze condition, where the inverted grating is used in spectral order −m, the quantities $\overline{GV}$ and $\overline{GI}$ are interchanged, and the curvature radius $R_G$ is negated. The radius of curvature remains infinite for a plane grating in this case. This ability to use an inverted grating permits the choice of either inside or outside spectral orders to optimize the performance of a monochromator or spectrometer using optical system 10, without requiring the fabrication of a new mechanical grating ruling.

While in the foregoing embodiments of the present invention have been set forth in considerable detail for the purposes of making a complete disclosure of the invention, it may be apparent to those of skill in the art that numerous changes may be made in such detail without departing from the spirit and principles of the invention.

What is claimed is

1. A spectrometer optical system employed in combination with a source of electromagnetic radiation and reception means, comprising:
   a. a first concave mirror receiving electomagnetic radiation from the source and reflecting the electromagnetic radiation within a first plane;
   b. a second concave mirror receiving the electromagnetic radiation reflected from the source and reflecting the electromagnetic radiation to converge in a second plane, said first and second planes being substantially orthogonal relative to each other;
   c. a diffraction grating receiving the converging electromagnetic radiation from the source and producing a spectrum for capture by the reception means; and
   d. means for rotating said diffraction grating about an axis relative to said diffraction grating.

2. The system of claim 1 in which said first concave mirror comprises;
   a. a flexible member having a specular surface, and
   b. means for bending said flexible member and for curving said specular surface.

3. The system of claim 1 which additionally comprises means for adjusting the orientation of said second concave mirror.

4. The system of claim 1 which additionally comprises an entrance slit interposed the source of electromagnetic radiation and said second mirror for intercepting the electromagnetic radiation prior to striking said diffraction grating.

5. The system of claim 1 in said diffraction grating includes a reflecting surface having plurality of substantially straight, parallel grooves of varying spacing from one another.

6. The system of claim 5 which additionally comprises an entrance slit placed between the source of light and said second mirror for intercepting the electromagnetic radiation prior to striking said diffraction grating.

7. The system of claim 6 which additionally comprises a light baffle interposed said entrance slit and said first mirror.

8. The system of claim 1 which additionally comprises a filter interposed the light source and the reception means.

9. The system of claim 1 which additionally comprises and exit slit interposed said diffraction grating and the reception means, said system being useable as a monochromator.

10. The system of claim 1 in which said diffraction grating is a first diffraction grating and which further comprises a second diffraction grating, and further includes means for moving said first and second diffraction gratings to selectively receive light reflected by said second mirror.

11. The system of claim 10 which additionally comprises an exit slit interposed said selectively placed first and second diffraction gratings and the reception means, said system being useable as a monochromator.

12. The system of claim 5 in which said diffraction grating reflecting surface is curved.

13. The system of claim 5 in which said diffraction grating reflecting surface is planar.

14. The system of claim 2 in which said means for bending said flexible member includes, at least a first and second block each having a pair of pins straddling said flexible member, said flexible member having an edge portion, said first and second blocks being placed along said edge portion of said flexible member.

15. The system of claim 12 in which said second concave mirror is spherical and said grating reflecting surface is spherical, and the radius of curvature of said grating is larger than the radius of curvature of said spherical second mirror.

16. The system of claim 6 which additionally comprises a concave pre-mirror intercepting light from the source, said pre-mirror focusing the light through the entrance slit.

17. The system of claim 1 which additionally comprises a concave pre-mirror intercepting light from the source, said pre-mirror focusing light in said second plane.

18. The system of claim 1 in which said grating possesses a straight, grooved, reflecting surface and a pole at the center of said reflecting surface, and said axis passes through said pole parallel to said straight grooves.

19. A spectrometer optical system employed in combination with a source of electromagnetic radiation and reception means comprising:
   a. a first mirror receiving electromagnetic radiation and reflecting the electromagnetic radiation, said first mirror including means for controlling the astigmatism of the image at the reception means;
   b. a second concave mirror receiving the electromagnetic radiation reflected from said first mirror and reflecting the electromagnetic radiation to converge in a plane, said first and second mirrors being positioned substantially orthogonally relative to each other;
   c. a diffraction grating receiving a converging electromagnetic radiation beam from said second concave mirror and producing a spectrum for capture by the reception means; and
   d. means for rotating said diffraction grating about an axis relative to said diffraction grating.

20. The spectrometer optical system of claim 19 in which said means for controlling the astigmatism of the image at the reception means includes forming said first mirror of a flexible member having a specular surface and means for bending said flexible member to curve said specular surface.

21. The system of claim 19 which additionally comprises an exit slit interposed said diffraction grating and the reception means, said system being useable as a monochromator.

22. An spectrometer optical system employed in combination with a source of electromagnetic radiation and reception means, comprising:
   a. a concave mirror receiving electromagnetic radiation from the source and reflecting the electromagnetic radiation to converge in a plane,
   b. a diffraction grating having a plurality of substantially varied spaced, parallel, grooves receiving the converging electromagnetic radiation from the concave mirror and producing a spectral image for capture by the reception means; and
   c. means for rotating said diffraction grating about an axis across said diffraction grating.

23. The system of claim 22 in which said diffraction grating is curved.

24. The system of claim 23 in which said concave mirror and reflecting surface of said grating are spherical and the radius of curvature of said grating is larger than the radius of curvature of said spherical mirror.

25. The system of claim 22 which additionally comprises means for controlling the astigmatism of the spectral image at the reception means.

26. The system of claim 25 in which said means for controlling the astigmatism of the spectral image at the reception means comprises another mirror interposed the source and said concave mirror.

27. The system of claim 26 in which said another mirror comprises:
   a. a flexible member having a specular surface, and
   b. means for bending said flexible member and for curving said specular surface.

28. The system of claim 22 which additionally comprises an exit slit positioned to intercept electromagnetic radiation from said grating, said system being useable as a monochromator.

29. The system of claim 26 in which said grating includes a dispersion plane perpendicular to said grating grooves, and said another mirror focuses into another plane substantially perpendicular to said grating dispersion plane.

30. The system of claim 19 in which said grooves of said grating are of a blazed configuration.

31. A spectrometer optical system employed in combination with a source of electromagnetic radiation and reception means, comprising:
   a. a spherical mirror receiving electromagnetic radiation from the source and reflecting the electromagnetic radiation to converge in a plane; and
   b. a diffraction grating including a reflecting surface having a plurality of substantially straight, parallel, grooves of varying spacing from each other, said grating receiving the converging electromagnetic radiation from said source and producing a spectral image for capture by the reception means.

32. The system of claim 31 in which said grating is planar.

33. The system of claim 31 in which said grating is curved.

34. The system of claim 31 in which additionally comprises an exit slit positioned to intercept electromagnetic radiation from said grating, said system being useable as a monochromator.

* * * * *

UNITED STATES PATENT AND TRADEMARK OFFICE

CERTIFICATE OF CORRECTION

Patent No.   :   4,776,696                Page 1 of 3

Dated        :   Oct. 11, 1988

Inventor(s)  :   Michael C. Hettrick

It is certified that error appears in the above-identified patent and that said Letters Patent is hereby corrected as shown below:

On the title page:

In the abstract, change "converge with" to "converge the".

Col. 6, line 10, change "sould" to "should".

Col. 8, line 8 and Col. 12, line 41, change "σw" to "$\sigma_w$".

Col. 13, equation 8, change "$\cos^{2\alpha}]$" to "$\cos^2 \alpha]$".

Col. 8, equation (i), Col. 12, equation (5), page 12, equations (7), Col. 13, equation (1) and Col. 16, equation (18), insert a line over the following distances, to become:

"$\overline{AI}$", "$\overline{SA}$", "$\overline{CV}$", "$\overline{EC}$", "$\overline{GI}$", "$\overline{GV}$", and "$\overline{SE}$".

UNITED STATES PATENT AND TRADEMARK OFFICE

CERTIFICATE OF CORRECTION

Patent No. : 4,776,696

Dated : Oct. 11, 1988

Inventor(s) : Michael C. Hettrick

It is certified that error appears in the above-identified patent and that said Letters Patent is hereby corrected as shown below:

Col. 2, line 16, insert "(U.S. Pat. No. 4,380,393)" after "Nagata".

Col. 8, lines 36 and 37, replace "principal ray to n" by "the surface normals".

Col. 11, line 24, insert "$\lambda$" after "Where".

Col. 11, line 25, insert "$\sigma_0$" before "is the spacing".

Col. 11, line 25, insert "$2\theta$" before "the fixed angle".

Col. 2, line 12, insert "$R_G$" after "radius".

Col. 12, line 58, change "$\sin^3<\alpha>$" to "$\sin^2<\alpha>$".

Col. 13, line 3, change "$\sin^3<\beta>$" to "$\sin^2<\beta>$".

Col. 12, line 59, change "+" to "-".

Col. 13, line 36, change "M" to "m".

UNITED STATES PATENT AND TRADEMARK OFFICE

CERTIFICATE OF CORRECTION

Patent No.  :  4,776,696

Dated  :  Oct. 11, 1988

Inventor(s)  :  Michael C. Hettrick

It is certified that error appears in the above-identified patent and that said Letters Patent is hereby corrected as shown below:

Col. 14, line 44, insert "where $W_c$ is the full illuminated width of mirror 108" after equation 13.

Col. 16, line 35, insert "$\eta_p$" after "reflectance".

Signed and Sealed this

Tenth Day of April, 1990

*Attest:*

HARRY F. MANBECK, JR.

*Attesting Officer*     *Commissioner of Patents and Trademarks*